United States Patent
Lanz

(10) Patent No.: US 8,105,546 B2
(45) Date of Patent: Jan. 31, 2012

(54) APPARATUS AND METHOD FOR DESTROYING VOLATILE ORGANIC COMPOUNDS AND/OR HALOGENIC VOLATILE ORGANIC COMPOUNDS THAT MAY BE ODOROUS AND/OR ORGANIC PARTICULATE CONTAMINANTS IN COMMERCIAL AND INDUSTRIAL AIR AND/OR GAS EMISSIONS

(75) Inventor: Douglas Philip Lanz, Surrey (CA)

(73) Assignee: Air Phaser Environmental Ltd., Surrey (CA)

( * ) Notice: Subject to any disclaimer, the term of this patent is extended or adjusted under 35 U.S.C. 154(b) by 965 days.

(21) Appl. No.: 10/908,502

(22) Filed: May 14, 2005

(65) Prior Publication Data
US 2006/0257299 A1    Nov. 16, 2006

(51) Int. Cl.
*B01J 19/08* (2006.01)
(52) U.S. Cl. ............... 422/186; 422/186.03; 422/186.07; 422/186.05; 422/186.21; 204/164; 204/176; 204/178
(58) Field of Classification Search .............. 422/186, 422/186.03, 186.05, 186.07, 186.21; 204/164, 204/176, 178
See application file for complete search history.

(56) References Cited

U.S. PATENT DOCUMENTS

| | | | |
|---|---|---|---|
| 5,843,288 A * | 12/1998 | Yamamoto | 204/164 |
| 5,855,855 A | 1/1999 | Williamson et al. | |
| 5,871,703 A | 2/1999 | Alix et al. | |
| 5,904,905 A | 5/1999 | Dolezal et al. | |
| 6,030,506 A | 2/2000 | Bittenson et al. | |
| 6,146,599 A | 11/2000 | Ruan et al. | |
| 6,214,303 B1 * | 4/2001 | Hoke et al. | 423/210 |
| 6,253,544 B1 | 7/2001 | Miller et al. | |
| 6,432,280 B1 | 8/2002 | Bianco et al. | |

(Continued)

FOREIGN PATENT DOCUMENTS
KR    2001070547    * 7/2001

OTHER PUBLICATIONS

Becker et al., "Environmental and Biological Applications of Microplasmas," Plasma Phys. Control. Fusion 47:B513-B523, 2005.

(Continued)

*Primary Examiner* — Jeffrey T Barton
*Assistant Examiner* — Xiuyu Tai
(74) *Attorney, Agent, or Firm* — Seed IP Law Group PLLC

(57) ABSTRACT

A non-thermal plasma (NTP) system is used to treat air containing volatile organic compounds (VOC) and/or halogenated volatile organic compounds (HVOC), some of which may be odorous, and/or fine organic particulate (smoke) emissions to be released into the environment by commercial and/or industrial air exhausting, using one or more compound dielectric barrier discharge (DBD) devices that each incorporate a plurality of catalytically active DBD electrodes, catalytically active parts and dielectrics to develop one or more NTP fields so as to create sufficient reactive oxygen species, hydroxyl species and other highly ionized molecules and atomic species so as to cause the oxidation and/or reduction of VOC's and/or HVOC's and/or fine organic particulate contaminants in the air streams to be decomposed to simpler, non pollutant, non odorous compounds that can be subsequently released into the environment.

30 Claims, 5 Drawing Sheets

U.S. PATENT DOCUMENTS

| | | |
|---|---|---|
| 6,451,252 B1 | 9/2002 | Ruan et al. |
| 6,458,741 B1 * | 10/2002 | Roark et al. .................. 502/303 |
| 6,464,945 B1 * | 10/2002 | Hemingway ................. 422/174 |
| 6,537,507 B2 | 3/2003 | Nelson et al. |
| 6,767,434 B1 * | 7/2004 | Imanishi et al. ............. 204/164 |
| 6,811,757 B2 | 11/2004 | Niv et al. |
| 6,991,768 B2 | 1/2005 | Keras et al. |
| 2002/0070127 A1 * | 6/2002 | Song et al. .................... 205/763 |
| 2003/0030374 A1 | 2/2003 | Pai |
| 2005/0023128 A1 | 2/2005 | Keras et al. |
| 2005/0147546 A1 * | 7/2005 | Long ........................ 422/186.07 |

OTHER PUBLICATIONS

Daniels, "On the Ionization of Air for Removal of Noxious Effluvia (Air Ionization of Indoor Environments for Control of Volatile and Particulate Contaminants with Nonthermal Plasmas Generated by Dielectric-Barrier Discharge," IEEE Transactions on Plasma Science 30(4):1471-1481, 2002.

Rosocha, "Nonthermal Plasma Applications to the Environment: Gaseous Electronics and Power Conditioning," IEEE Transactions on Plasma Science 33(1):129-137, 2005.

* cited by examiner

Fig. 4
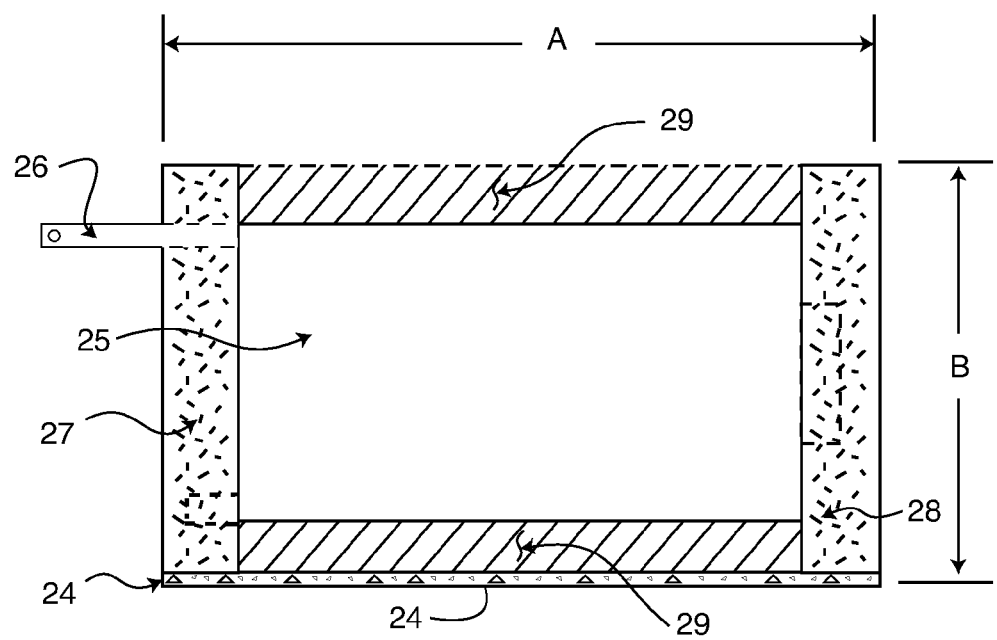
Fig. 3

APPARATUS AND METHOD FOR DESTROYING VOLATILE ORGANIC COMPOUNDS AND/OR HALOGENIC VOLATILE ORGANIC COMPOUNDS THAT MAY BE ODOROUS AND/OR ORGANIC PARTICULATE CONTAMINANTS IN COMMERCIAL AND INDUSTRIAL AIR AND/OR GAS EMISSIONS

FIELD

The invention is in the field of treating air and/or gases that is nearly or at atmospheric pressure from commercial and/or industrial operations and processing wherein the air and/or gases used for such activity contain volatile organic compounds (VOC's) and/or halogenic volatile organic compounds (HVOC's) and/or hydrocarbon compounds (HC's) and/or fine suspended organic particulate matter such as smoke, which are considered to be pollutants, some of which may or may not be odorous and the removal of emitted odor is also of concern, and these pollutants need to be removed and/or converted to non objectionable compounds prior to release of the air and/or gas to the environment atmosphere, and wherein the removal systems include non-thermal plasma (NTP) field or fields with integral catalytic components.

BACKGROUND

Air born volatile organic and/or halogenic volatile organic compound contaminants (VOC's & HVOC's) and/or hydrocarbon compounds and/or fine suspended organic particulate particles (smoke), which may or may not be odorous—collectively referred to herein as airborne pollutants, are emitted into the environment air from a range of sources and processes and can fill the air in and about residential neighborhoods in still weather conditions. Many such airborne pollutants are considered to be pollutants and emission levels are regulated by the US EPA and even those that are not but are odorous can range in odorous delectability from mildly offensive to intolerable levels for the residents in the affected area. This is a common problem for residents that are in proximity to such sources. Examples of airborne pollutant emissions that are considered odorous sources include industries that process organic materials such as those that process and produce all types of food for human consumption which include bakeries, chocolate processing, frying and other related human food processing and industries that produce animal feed for the pet, fish, poultry and hog industry, and general agricultural applications. Other industries that process organic materials and release airborne pollutants that are odorous are those that process animal products including meat processing, fertilizer and rendering plants. Other airborne pollutant odor sources include composting facilities, sewage treatment centers, garbage transfer stations and other industrial organic processing facilities. Generally, these commercial and industrial operations exhaust gases from the preparation, handling, storage, cooking, grinding, drying, cooling, manufacturing, reduction and other related processes of organic materials. These exhausts contain medium to low-level mixed concentrations VOC's and HVOC's that include amines, aldehydes, and fatty acids that can be either fully evaporated and/or in aerosol form that are inherent in the materials processed, or resulting from the processing and are driven into the exhausted gas stream by the preparation activity. These industries typically have large gas flow volumes, ranging from 100 to 500,000 actual cubic feet of gas per minute (ACFM) and above.

Agricultural activities that raise animals for food production, such as hog, poultry and dairy farms also emit strong and offensive odors into the environment air from manure and barn ventilation odors and these can release offensive odors in sufficient quantity to fill many square kilometers under certain weather conditions.

Solvents, cleaning fluids, paint fumes, printed circuit board manufacturing and other VOC's and HVOC's are additional sources of environmental air emissions from other general industrial and commercial activities. Some VOCs may have little or no odor, but are considered atmospheric pollutants and/or carcinogens and need treatment to reduce them to harmless compounds prior to release into the environment. In the case where the airborne pollutants of concern are extremely odorous, even concentrations in the parts per billion ranges can be offensive or exceed environmental emission limits and these also need treatment.

There are various systems designed to oxidize and/or reduce VOC emissions and other airborne pollutants resulting from commercial and/or industrial processing activity that is to be emitted into the environment so that the emitted exhaust gas stream is within environmental regulatory limits. Some of these systems use non-thermal plasma (NTP) which is formed in dielectric barrier discharge (DBD) cells to create a wide range of activated species such as activated or reactive oxygen species (ROS), hydroxyl species and molecular and atomic species that are all at various levels of ionization and these are then mixed with the gas to be treated so that the VOC's and HVOC's undergo oxidation and/or reduction by the chemical reactions caused by the active species created by the NTP field. Many of the VOC's and HVOC's emitted from commercial and industrial processing, some of which are compounds that humans normally detect as odor, ultimately reduce to carbon dioxide and water vapor, though other products are possible depending on the chemical characteristics of the pollutants and by the energetic ions and species created in the non-thermal plasma field created by the DBD cells.

Activated species, as described herein, are chemical compounds and atomic species that are created in useful concentrations by the application of sufficient and appropriate electrical energy, such as through dielectric barrier discharge, to drive the molecules of interest from the ground state into the excited active states required, splitting some molecules into their atomic constituents, with the ground state being the normal state of these molecules typically at a nominal one atmosphere pressure and 20 degrees C. (or whatever atmospheric and temperature conditions occur at the place of the NTP field conditions). Activated species are typically designated in literature by "•" as in O• for active oxygen (atomic oxygen in this case). Activation occurs through a number of mechanisms including direct electron collisions or secondary collisions, light absorption, molecular processes involving ionization, or internal excitation.

Dielectric Barrier Discharge (DBD) technology is used to create the NTP that generates the activated species required for the purposes of this invention, and as such technology inherently limits the electron volt (eV) that can be applied to the gasses passing through the barrier, it is mainly the reactive oxygen species (ROS) which include a range of hydroxyl radicals and excited atomic oxygen, that are involved in this case, though other electron activity assists in the process. For the activated species generated in the NTP field, those ROS species that have the highest reduction potential (between about 2.4 and 6.5 eV) have the shortest availability with half-life concentrations of less than about 200 microseconds, such as in the case of oxygen singlet. These react with all compounds that pass through the NTP field, though in the case where the VOC's and/or HVOC's that need to be destroyed have a high ionic bonds, those need the high reduction potential active species that are also the shortest lived, found only in sufficient concentrations in the NTP field, to reduce and/or oxidize them. The highest reduction potential species, also called radicals, and the reactions between them and the VOC and/or HVOC compounds needing a high level of eV energy to destroy them, occur only in the NTP field, as the most active radicals quickly decay to less active species outside the NTP field. The radicals react with the VOC and/or HVOC compounds by oxidation and reduction transformations so that the VOC compounds are transformed to simpler molecular compounds that are no longer detectable as odor and are no longer classified as pollutants. Additional activity occurring within the NTP is that of electron collisions, bombardment and direct ionization, which acts on all molecules within the field, including the compounds of concern. This electron action, as well as creating the ROS of interest, also results in the disruption of the molecular bonds of the VOC and/or HVOC compounds, which also aids in the ROS activity of oxidation and/or reduction of the VOC and/or HVOC compounds reducing them to non odorous forms. The NTP field also creates, within the ROS, a range of lower reduction potential radicals (between about 1.4 and 2.4 eV), and these are longer lived with half-lives from about 100 milliseconds to several minutes at normal atmospheric temperatures and pressures. These radicals react with the VOC and HVOC compounds that respond to this level of reduction potential and oxidation for decomposition. These reactions occur both in the NTP field and in the air stream outside the NTP field, as those radicals are active longer, and are carried outside the NTP field by the airflow through the DBD. These longer-lived radicals also effect their changes on the VOC and HVOC compounds by oxidation and reduction transformations, so that the compounds of concern are transformed to simpler molecular forms that are no longer considered to be pollutants or detectable as odor. Such transformations also ultimately convert the complex organic molecules and hydrocarbon molecules into the most simplified oxides, such as carbon dioxide, hydrogen dioxide (water), nitrogen ($N_2$) and other simplified molecular or oxide forms of the elements that were in the original complex compounds. In cases where large volume air streams need to be treated, usually a portion of the air to be treated passes through the NTP field for treatment and excessive ROS, hydroxyl, ionized molecular and atomic activation and these species created is then immediately mixed with the balance of the air to be treated so that the treatment of the entire air stream is accomplished. In cases where the pollutant of concern is relatively highly concentrated or simply needs more energy than what a single NTP field is able to deliver, then the air path can be through multiple series and/or series parallel NTP fields to effect treatment.

Four oxidation states of molecular dioxygen are known: $[O_2]^n$, where n=0, +1, −1, and −2, respectively, for dioxygen, dioxygen cation, superoxide anion, and peroxide dianion (symbolically expressed as $^3O_2$, $^3O_2^+$, $^3O_2^-$, and $^3O_2^{-2}$). In addition, "common" oxygen in air, $^3O_2$, is in a "ground" (not energetically excited) state. It is a free "diradical" having two unpaired electrons. The two outermost pair of electrons in oxygen have parallel spins indicating the "triplet" state (the preceding superscript "3", is usually omitted for simplicity). Oxygen itself is a common terminal electron acceptor in biochemical processes. It is not particularly reactive, and by itself does not cause much oxidative damage to organic compounds. It is a precursor, however, to other oxygen species that can be toxic, including: superoxide anion radical, hydroxyl radical, peroxy radical, alkoxy radical, and hydrogen peroxide. Other highly reactive molecules include singlet oxygen, $^1O$, and ozone, $O_3$.

Ordinary oxygen does not react well with most molecules, but it can be "activated" by the addition of energy (naturally or artificially derived; electrical, thermal, photochemical or nuclear), and transformed into reactive oxygen species (ROS). Transformation of oxygen into a reactive state from the addition of a single electron is called reduction (Eqn. 1). The donor molecule that gave up the electron is oxidized. The result of this monovalent reduction of triplet oxygen is superoxide, $O_2^{\bullet-}$. It is both a radical (•, dot sign) and an anion (charge of −1). Some reactive oxygen species known to be created with NTP, but by no means all, are noted below:

$$O_2 + e \rightarrow O_2^{\bullet-} \quad \text{(Eqn 1)}$$

$$2O_2^- + 2H^+ \rightarrow H_2O_2 + O_2^\bullet \quad \text{(Eqn 2)}$$

$$O_2^- + H_2O_2 \rightarrow O_2 + OH\bullet + OH^- \quad \text{(Eqn 3)}$$

$$O_2^- + 2H_2O \rightarrow O_2 + HO_2^- + OH\bullet^- \quad \text{(Eqn 4)}$$

$$2O_2^- + O_2 + H_2O \rightarrow 2O_2 + OH^- + OH\bullet \quad \text{(Eqn 5)}$$

For any given reactive oxygen species (ROS), there exists some confirmed or postulated reaction scheme for inter conversion to any of the other species. In any event, several of the above reactive oxygen species may be generated in the NTP and react with the VOC and/or HVOC compounds to transform them into simpler compounds that are no longer considered to be pollutants or detected as odorous.

Commercial and industrial volumes of air and/or gases to be treated normally have contaminants such as condensing water or other vapors and liquids, particles of some kind, or mixtures of both condensing fluids and particles. A problem arising from the use of dielectric barrier discharge (DBD) cells, generating the NTP for treating industrial scale flows of contaminated gases, is that after a period of use, the contaminants inherent in these gases build up in the cells and cause electrical short circuits in the cells from hot electrodes, across the insulation and support frames, to the ground frame or ground electrodes. This interferes with the designed electrical properties of the DBD cell and immediately destroys any ability for the DBD cell to generate the NTP should a continuous arc occur or the integrity of the DBD insulation becomes compromised. In some cases, a quick flashover arc will occur and clear. An industrial example of this is in utility electrical power distribution, where the porcelain or more modern type, polymer concrete insulators on the high tension lines can withstand a short duration electrical flash. In the case where a sustained arc occurs it is very likely DBD cell component damage has occurred as electrical arcs have very high temperatures and parts are usually damaged that have been in contact with the arc, and at the very least, cleaning of the DBD cell is necessary to restore the electrical dielectric integrity of the DBD cell, and damaged parts must be replaced. It is an important, practical consideration to pay due attention to the DBD cell design so that the effects of normal operation in an industrial environment have minimal effect on the operation of the DBD cells and no combustible material be used in any area of the cell where a flash over might occur.

BRIEF SUMMARY OF THE INVENTION

According to the invention, a dielectric barrier discharge (DBD) cell constructed of catalytically active materials is used to create non-thermal plasma (NTP) field is particularly useful as part of apparatus for treating gases containing VOC's and/or HVOC's some of which may or may not be particularly odorous, includes electrodes shaped, aligned and positioned within the DBD assembly to confine the area of NTP generation to keep the NTP away from the support frames and terminals for the electrodes so the DBD frame and terminations do not suffer damage from the NTP. Further, at least the portions of all electrodes in the cell where the contaminated gases to be treated, pass through the support frame in a sealed manner, so contaminants in the air stream being energized by the NTP field does not interfere with the electrical connections to the electrodes. Further, the gas treating apparatus of the invention may be configured so that with gases that can be treated satisfactorily with relative low energy activated species, a portion of the air to be treated and/or atmospheric air is passed through the NTP to generate the activated species and that activated air is then mixed with the gas to be treated where the longer lasting activated species react with the VOC and HVOC molecules in the air and/or gas to treat all of the air and/or gas to be treated. With compounds that require more energy to treat, some or all of the gas to be treated passes through the NTP where many forms of electron activity in the NTP field and the shorter lived, higher energy electron volt activated species all act on the compounds to be treated. One or more catalytically active materials may be present in the DBD in that the electrodes could be made of a catalytically active material or coated with a catalytically active material and the dielectric separating the electrodes may also be coated with a catalytically active material, further more there may be additional catalytically active material present immediately at the DBD outlet and in the mixing chamber area to facilitate the oxidative and reduction reactions desired to destroy the compounds of concern. Generally larger capacity cells for generating NTP are necessary when all gas to be treated is passed through the cells.

According to another embodiment of the invention, the apparatus for treatment of volatile organic compounds (VOC's) or halogenated volatile organic compounds (HVOC's), some of which may or may not be odorous and/or organic fine particulate contaminants in gas emissions, comprising: planar dielectric barrier discharge (DBD) type non-thermal plasma (NTP) generation cell assemblies having a gas flow path therethrough, said cells each having a plurality of electrically hot electrodes and ground electrodes alternately positioned with respect to each other, located in the air and/or gas flow path so that the air and/or gas flowing in the gas flow path will flow through the air space between these electrodes, all electrodes either being made of catalytically active materials or coated with a catalytically active material, a dielectric material separating the electrodes to prevent a direct arc from occurring between electrodes with an alternating voltage potential difference in operation so that the DBD develops an NTP field when sufficient power is applied so that a range of reactive oxygen species (ROS), hydroxyl species, molecular and atomic species all of which are in various states of low, medium and highly ionized states—Reactive Species (RS), with the dielectric barriers also possibly coated with a catalytically active material; a gas inlet leading to the gas flow path through the cells; and a cells gas outlet for discharging gas that has passed through the cells and a further catalytically active mesh at the DBD outlet that the gas must pass through.

According to another embodiment of the invention, the apparatus for treatment of VOC's and/or HVOC's some of which might be odorous and/or may contain organic fine particulate contaminants in gas emissions according to the preceding, wherein the DBD assemblies gas inlet is connected to a source of air and/or gas emissions, and the DBD assemblies gas outlet discharges treated air and/or gas for discharge after being treated with the NTP created Reactive Species and said DBD assemblies can be connected in parallel to handle large air flow and they can also be connected in series so that the same air stream passes through subsequent NTP fields to treat higher levels of contamination and said DBD assemblies can also be connected in series/parallel arrangement to treat large volumes of higher level contaminated air streams.

According to another embodiment of the invention, the apparatus for treatment of VOC's and/or HVOC's some of which might be odorous and/or may contain organic fine particulate contaminants in gas emissions according to the preceding, additionally including a gas mixing chamber so that the remainder of the air and/or gas to be treated can be mixed with that portion of the air and/or gas to be treated that was divided from the total of the air and/or gas to be treated and passed through the DBD cells and activated by the NTP field so that portion of air and/or gas is treated and contains extra reactive species to be mixed in the mixing chamber which is immediately after the DBD cells with that portion of gas that did not pass through the DBD cells so that portion of the air and/or gas gets treated also by the extra reactive species created and the mixing chamber gas outlet is for discharging all mixed and treated air and/or gas that has passed through the apparatus and can be ducted to be discharged.

According to another embodiment of the invention, the apparatus for treatment of VOC's and/or HVOC's some of which might be odorous and/or may contain organic fine particulate contaminants in gas emissions according to the preceeding, wherein the DBD cell assemblies each cell consisting of a plurality of alternating potential electrodes either made up of a catalyst conductor or coated with a catalyst material separated by a dielectric which also may or may not be coated with a catalytic material and held in place by a non conductive frame and where other catalytically active materials can be used in the DBD cell assemblies or elsewhere in the apparatus to facilitate the destruction of the contaminants of concern.

According to another embodiment of the invention, the apparatus for treatment of VOC's and/or HVOC's some of which might be odorous and/or may contain organic fine particulate contaminants in gas emissions according to the preceeding, wherein the discharge air and/or gas may be ducted to an additional catalyst or two catalyst systems for creation of yet more gaseous catalytic reduction reactions and possibly destruction of excess ozone, should excess ozone exist in the discharge air and/or gas to be treated.

According to another embodiment of the invention, the apparatus for treatment of VOC's and/or HVOC's some of which might be odorous and/or may contain organic fine particulate contaminants in gas emissions according to the preceeding, wherein the assembly that holds the electrodes and dielectric that forms the DBD assembly uses an alumina or borosilicate glass as some of the dielectric material, some of the ceramic material is polymer concrete, specifically designed for high voltage insulation applications, some of the insulating material being teflon or other non metallic insulator materials.

According to another embodiment of the invention, the apparatus for treatment of VOC's and/or HVOC's some of which might be odorous and/or may contain organic fine particulate contaminants in gas emissions according to the preceeding, wherein the electrodes of the DBD are either constructed of catalytically active material or coated with a catalytically active coating and are in planar positional alignment of alternating hot and ground electrodes, separated by a dielectric barrier spaced midway between the surface of the electrodes and that an air gap exists between the electrodes and the dielectric barrier that can range from 0.1 mm up to 25.0 mm between each electrode and the separating dielectric, which can be from 0.1 mm up to 10.0 mm thick and the with equal spacing between the hot electrode and the dielectric barrier and the ground electrode and the dielectric barrier so that most of the area of both hot and ground electrodes is exposed to the air to be treated to enable the catalytic action of the electrodes and other action the dielectric barrier has to have maximum effect, with the electrode alignment in parallel plate arrangement so as to create one multi electrode DBD in each DBD assembly so a large volume NTP field will develop between all opposing electrode surfaces when electrically energized as needed.

According to another embodiment of the invention, the apparatus for treatment of VOC's and/or HVOC's some of which might be odorous and/or may contain organic fine particulate contaminants in gas emissions according to the preceeding, wherein the electrically insulating material holding the electrodes in position is a ceramic material and the dielectric separating the electrodes extends beyond the electrodes on all sides of the plane, even where they are held in alignment within the cell assembly so as to maximize the distance that an electric arc might travel so as to use air spacing to complement the insulation properties of the insulating materials, with the edges of the electrodes cut in offset shape so they do not oppose where they are held in position within the electrode end insulators near the DBD support frame so as to prevent the NTP field from forming near the edge of the electrodes where they are held in position by the rectangular support frame to prevent the NTP field from touching the support frame and so as to maximize the electric arc travel distance between the hot and ground electrodes around the ceramic dielectric barrier that separates the opposing electrode surfaces, to prevent short circuiting of the electrodes and other DBD parts. Another configuration permits dispensing of the dielectric barrier altogether should the DBD assembly be powered with sufficiently fast pulses of sufficiently short duration.

According to another embodiment of the invention, the apparatus for treatment of VOC's and/or HVOC's some of which might be odorous and/or may contain organic fine particulate contaminants in gas emissions according to the preceeding, wherein a NTP field is generated between electrodes separated by the dielectric barrier, when power is applied to the electrodes and the perimeter of the hot electrodes that oppose ground electrodes establishes a perimeter for the NTP field generated between electrodes substantially equal to the perimeter of the hot electrodes, whereby the NTP field is kept away from the electrode support frame.

According to another embodiment of the invention, the apparatus for treatment of VOC's and/or HVOC's some of which might be odorous and/or may contain organic fine particulate contaminants in gas emissions according to the preceeding, wherein power is applied to the electrodes to generate a "glow discharge" and not a "filament discharge" NTP field between the electrodes and wherein the power is an AC voltage of between about 500 volts and about 150,000 volts at a frequency of between about 30 Hz and about 50 MHz. Alternately, the power applied can be a bi-polar pulse with a pulse rise time anywhere from 1 nano seconds to 500 milli seconds, a pulse duration that can be equal to the rise time or as long as 1000 milli seconds with an equivalent fall time as rise time followed with the same rise time in the opposite polarity pulse of identical or similar voltage power characteristics, with an off period so that the repetition rate is equivalent to joules per second per square centimeter rate ranging from 0.01 up to 1,000. Alternately the system can be supplied by a combination of positive and negative going pulses with a DC bias as to create a visible "glow discharge" NTP field between the electrodes.

According to another embodiment of the invention, the apparatus for treatment of VOC's and/or HVOC's some of which might be odorous and/or may contain organic fine particulate contaminants in gas emissions according to the preceeding, additionally including a dielectric barrier discharge NTP generation cell power control system and an ozone sensor in the treated gas leaving the apparatus, the ozone sensor providing an indication of the ozone content of the treated gas, the ozone content of the treated gas being indicative of the extent of treatment of the gas, the indication of ozone content of the treated gas being transmitted to the control system to control the power provided to the cells.

According to another embodiment of the invention, the apparatus for treatment of VOC's and/or HVOC's some of which might be odorous and/or may contain organic fine particulate contaminants in gas emissions, comprising: a dielectric barrier discharge NTP generation cell having a gas flow path therethrough, said cell having a plurality of electrically hot electrodes and ground electrodes, both types of electrodes being conductive and possibly made from a catalytically active material or coated with a catalytically active material, alternating hot and ground electrodes separated by a dielectric barrier so as to create a non-thermal plasma when electrically energized, with said electrodes producing the NTP field positioned in the gas flow path so that gas flowing in the gas flow path will flow across a portion of these electrodes throught the NTP field; a cell gas inlet leading to the gas flow path through the cell; a cell gas outlet for discharging gas that has passed through the cell; a gas mixing chamber having a first section for gas inlet connected to the DBD cell gas outlet and a second section gas inlet, the mixing chamber mixing gas entering the chamber from the first and second inlets; and a mixing chamber gas outlet for discharging gas that has passed through the mixing chamber, said inlets being arranged so that the cell gas inlet is selectively connected to a source of contaminated gas to be treated, to a source of atmospheric air, or to sources of both contaminated gas and atmospheric air which may have an additional catalytic material to facilitate the oxidative and reduction reactions of the mixing chamber and following that the possibility of an ozone destruct catalyst further downstream of the apparatus.

The DBD cells that generate the NTP field are planar in design and can utilize a catalytically active electrically conductive electrode or other conductor that may or may not have a catalytically active coating, where the thickness of the electrode ranges from 0.1 to 10 mm in thickness, the height of which ranges from 5 mm up to 1500 mm or more, and the length ranges from 10 mm up to 2500 mm or more and are aligned so that the surfaces are equally spaced apart and separated by an air gap ranging from 0.1 mm up to 50.0 mm in distance. When powered by alternating current frequencies below 5 MHz and/or with slow rise time voltages, a dialectic barrier is required and when needed is centered in the air gap between the electrodes, the dielectric barrier ranges in thickness from 0.5 mm up to 10.0 mm but sized in accordance with the space between the electrodes so as always to leave an air gap between the surface of both sides of the dielectric barrier and the surface of the electrodes. The dielectric barrier is also sized length and width wise to extend far enough beyond the edges of the electrodes so as to prevent an arc air path from an electrically "hot" electrode to a "ground" electrode around the dielectric barrier. The dielectric barrier may or may not be coated on one or both surfaces with a catalytically active coating or a coating that increases the dielectric properties of the dielectric. When powered by radio frequencies or if powered by fast rising pulses of sufficiently short duration, typically nano second rise time and nanosecond duration, a dielectric barrier may not be required and there is only an air gap between the "hot" and "ground" electrodes.

The two types of electrodes within the DBD, "hot" and "ground" electrodes, are identical in size and shape and are differentiated by which side of the DBD frame assembly the conduction tab protrudes from, either the "hot" or "ground" side of the frame. They are flat parallel mounted plates that are made from an electrically conductive material and can be made from or coated with a catalytically active material and are exposed where the NTP field is desired so that the catalytic material can aid in the electrochemical reactions desired. Where the edge of the electrodes are near and supported by the electrode supporting frame, that portion of each electrode is sealed in a high potential insulator with chemically resistant and high thermal resistance properties, typically a ceramic material, such as borosilicate glass, alumina ceramic or polymer concrete. This electrode edge insulator is sealed to the edges of each electrode to ensure electrical isolation of the electrode within the electrical insulation materials and to provide electrical isolation between the electrode and the DBD frame assembly. The metal part of each electrode has a tab that extends through one edge insulator and through the support frame so that an electrical connection can be made to each electrode. The development of the NTP field near the support frame is prevented by a series of cut out areas of the electrode within the edge insulators so that no conducting parts of the "hot" electrodes is opposite to a conducting part of a "ground" electrode within the insulating end connectors. It is within the space between electrodes, where a "hot" electrode is directly facing and opposite to a "ground" electrode, and possibly separated by a dielectric barrier, that the NTP forms when appropriate power is applied to the electrodes. Since "hot" and "ground" electrodes are facing each other in alternating arrangements so that a "hot" electrode has a "ground" electrode on either side of it and a "ground" electrode has a "hot" electrode on either side of it and the alternating of the electrodes is such that the "outside" electrode in each frame is a ground electrode, this has the effect that all electrodes develop an NTP field on both sides when energized, except for the outside ground electrodes which only develop an NTP field on the side that faces inside the DBD assembly and has an opposing "hot" electrode. The number of electrodes can range from a single "hot" electrode with a ground electrode on either side of it to form NTP on both sides of the "hot" electrode, or 2 plasma areas in the single "hot" electrode example to as many as 40 or more "hot" electrodes with each "hot" electrode having a "ground" electrode one both sides of it so that an alternating sequence of "hot" and ground electrodes in the case of 40 "hot" electrodes would have 41 "ground" electrodes and all sides of each "hot" electrode would then develop a large volume NTP field when energized.

The desired NTP field characteristics is an atmospheric glow type non thermal plasma field rather than a filamentary glow plasma, as it is the atmospheric glow NTP that creates the highest population of the chemically active species due to the electron activity being spread out evenly in the area of the NTP. The design of the DBD that creates the desired type of NTP field is dictated by a number of practical considerations such as the spacing between electrode plates, the dielectric barrier material chosen, properties and thickness, the thickness of the electrode plates, electrode support frame materials, catalytic materials used and how they are incorporated in the DBD assembly and the electrical network and power characteristics applied to the DBD. If the spacing between the electrodes is excessive and/or the voltage applied to the electrodes is inadequate, and/or if the electrical impedance is not matched between the DBD electrodes capacitance and the inductance of the power supply and/or if the voltage rise time is too slow and/or if the power density of the electrodes is insufficient then a streamer discharge NTP will form rather than an atmospheric glow discharge type NTP field and it will have diminished effectiveness in creating the reactive species required. If the power delivered to the DBD is inappropriate for the DBD materials used, such as the dielectric barrier itself, or the frequency is too low and/or not impedance matched, then excessive electrical losses and heating in the dielectric will result, the power delivery components will need over sizing, having the effect of causing premature DBD component failures and those conditions create inefficiencies amounting to a significant percentage of the total power needed. The efficiency of reactive species generation is significantly less when a streamer discharge NTP field forms and the radical creation efficiency is also impacted by low frequency operation, hence it is critical to design the DBD materials, electrode spacing, power supply specifications correctly and adjust all electrical parameters so that the glow discharge characteristics are established and maintained. Also, as this system is intended for commercial and industrial use and in many cases must run 24 hours a day, 7 days a week, robust construction methods for both mechanical and electrical integrity in the industrial environment of vibration, less than ideal air conditions and other factors require robust construction materials and methods for all aspects of design, especially for the ceramics, insulators and electrodes. The physical spacing and size of air gaps also affects the airflow through the DBD and the differential pressure across the DBD, which are further design considerations in air handling that must be considered.

A filamentary and/or glow NTP within the DBD will form with the application of high voltage alternating current between the "hot" and "ground" electrodes. This AC voltage needs to be anywhere from about 1,000 volts up to and above about 150,000 volts and at a frequency, anywhere from about 30 Hz up to about 50 MHz depending on the gas properties, cell geometry, materials used and type of NTP field desired. Alternately, the power applied can be a bi-polar pulse with a pulse rise time anywhere from 10 nano seconds to 500 micro seconds or more, a pulse duration that can be equal to the rise time or as long as 900 micro seconds or more with an equivalent fall time as rise time followed with the same rise time in the opposite polarity pulse of identical or similar voltage power characteristics, with an off period so that the repetition rate to exposed NTP area of electrode surface ranging from 0.01 up to 1,000 joules per second per square centimeter. Alternately the system can be supplied by a combination of positive and negative going pulses with a DC bias as to create an NTP field. There is a particular configuration of electrode spacing and power type that will result in a visible "glow discharge" NTP field between the electrodes as compared to the "streamer discharge" NTP field and it is the "glow discharge" that is desired for best operation.

The DBD assemblies, which consist of the individual electrodes, dielectric, frame assembly, insulation and interconnecting wiring materials, are housed in a fully enclosed metal cabinet, which is usually stainless steel, but can be any other metal that can be locked from unauthorized personnel entry and securely grounded. All high voltage components are totally enclosed in this grounded cabinet to meet standard industrial safety codes. The DBD assemblies can be grouped in any number of sets, typically of at least two as monitoring the power delivered to two or more DBD assemblies when powered by the same source can assist in fault determination of any DBD in the commonly powered set. The DBD's are powered by a specialized power supply that accepts normal industrial three phase power supply and converts that power to the voltage, frequency and waveform needed to operate the DBD's at their designed power level for creation of the NTP field needed to treat the compounds of concern. Also the ground electrode of all DBD assemblies are actually tied to electrical "earth" ground to maintain a consistent voltage profile across all DBD assemblies used and to make the system as electrically safe as possible.

The power required by the DBD's to create the NTP can be supplied to the DBD's at many differing levels. Low frequency power, from 30 to 2000 Hz typically requires a higher voltage than what higher frequency power needs and the lower frequency operation typically results in the NTP field dominated by streamer discharge, which is inefficient in the creation of the reactive species needed for the electrochemical reactions desired. At the lower frequencies ranging from 30 to 2 kHz, matching inductors on the transformer primary side may be needed to find a resonant or harmonic point of operation, though resonance is not actually needed to create a field. Significant plasma generation inefficiency exists at the lower frequencies as much electrical charge energy is lost within the DBD due to charge leakage across the capacitance DBD plates as the voltage slowly rises to the peak value. Higher frequencies, ranging from 10 kHz to 250 kHz provide a more uniform glow NTP field, and at these frequencies electrical matching networks are needed to minimize the power losses and transmit as much power into the NTP field as possible. This range of operation also is run near the electrical resonance point for best power transmission to the NTP field. Typically, in the cases where the DBD assemblies are powered by low and mid frequency power systems, the voltage waveform at the DBD assembly is a near sine wave and the final stage power that is applied to the DBD assemblies is provided by one or more step up transformers, installed inside the cabinet where the DBD assemblies are housed. In the case where the power supply is a pulsed power system, the final output may or may not be driven by a high voltage transformer; the actual technology used depends on the needs of the pulse formation network. Faster voltage rise and fall times that result from either higher frequencies or pulsed voltage operation create a higher population of chemically reactive species as less charge is lost from charge leakage as the voltage builds up to the peak value, as compared to low frequency operation, and with less charge loss, more charge is available per unit power to create the active species required.

The power supply used that has the ability to drive the high voltage transformers, if used, with the required frequencies, waveforms, voltage, and current, is typically located in a separate control cabinet, and its output is wired to the primary side of the high voltage transformers located in DBD cabinet. The voltage and frequency applied to the DBD, which controls the power level developed in the DBD, is varied by many possible means, one of which might be the width and frequency of the pulses in the case of a simple IGBT invertor that is typically used for industrial motor control, or by phase angle or duty cycle control in the case of an SCR or other type of IGBT supply, or by a changing the frequency in the case of a swept frequency IGBT supply that seeks the resonance or off resonance of the DBD capacitance and high voltage transformer inductance in combination with added inductance and/or capacitance of an impedance matching network, or by pulse repetition rate in the case of a pulsed power supply, or a fast duty cycle variation or by other means, and this voltage frequency combination is delivered to the high voltage transformer primary windings (when employed) and this in turn adjusts the voltage produced by the high voltage transformer secondary windings (when employed), which is then applied to the DBD which has the effect of adjusting the level of the NTP produced in the DBD. In the case were a pulse forming network is used and no high voltage transformer is needed then the pulse repetition rate varies the net power delivered to the DBD assemblies. Typically, a closed proportional integral derivative (PID) control loop that monitors the actual power output of the power supply system or the power delivered to the DBD assemblies, controls the power supply to a setpoint power level that can be cascaded from another control loop when an ozone sensor and control feedback is implemented, or a pre-programmed power level setpoint or a manually entered setpoint.

Systems designed to handle air flows from 50 actual cubic feet per minute (ACFM), or lower, to about 2000 ACFM employ scaled down, small DBD assemblies. These typically obtain their power source from a single phase supply. These are, usually, but not limited to, 5 kilo volt amps (kVA) and under, though some systems in this power range can be supplied by three phase power sources. Larger systems incorporating multiple parallel DBD assemblies for treatment of air flows from 2000 ACFM up to and beyond 250,000 ACFM can require power up to and exceeding 250 kVA, are typically powered by a three phase voltage source. Regardless of the air handling ability and power needed by whatever sized system is used, the net power of voltage and joules per square cm of the electrode surface area is in the same range on all systems. For higher air flow and/or power needs multiple DBD assemblies are arranged in parallel so the air flow is divided among all DBD assemblies. Also, when a compound needs more energy than what a single NTP field can deliver for the desired pollutant destruction level, the air stream can be fed to multiple series connected DBD assemblies, or series/parallel air streams can be established through multiple DBD assemblies.

BRIEF DESCRIPTION OF THE DRAWINGS

In the accompanying drawings, which show the best mode currently contemplated for carrying out the invention:

FIG. 3, a DBD electrode, showing the shape of a "hot" positioned electrode within the end insulators and comparative dielectric size and position to the electrode;

FIG. 4, showing the relative size of the ceramic DBD barrier to the electrode.

DETAILED DESCRIPTION OF THE INVENTION

Figure 1:
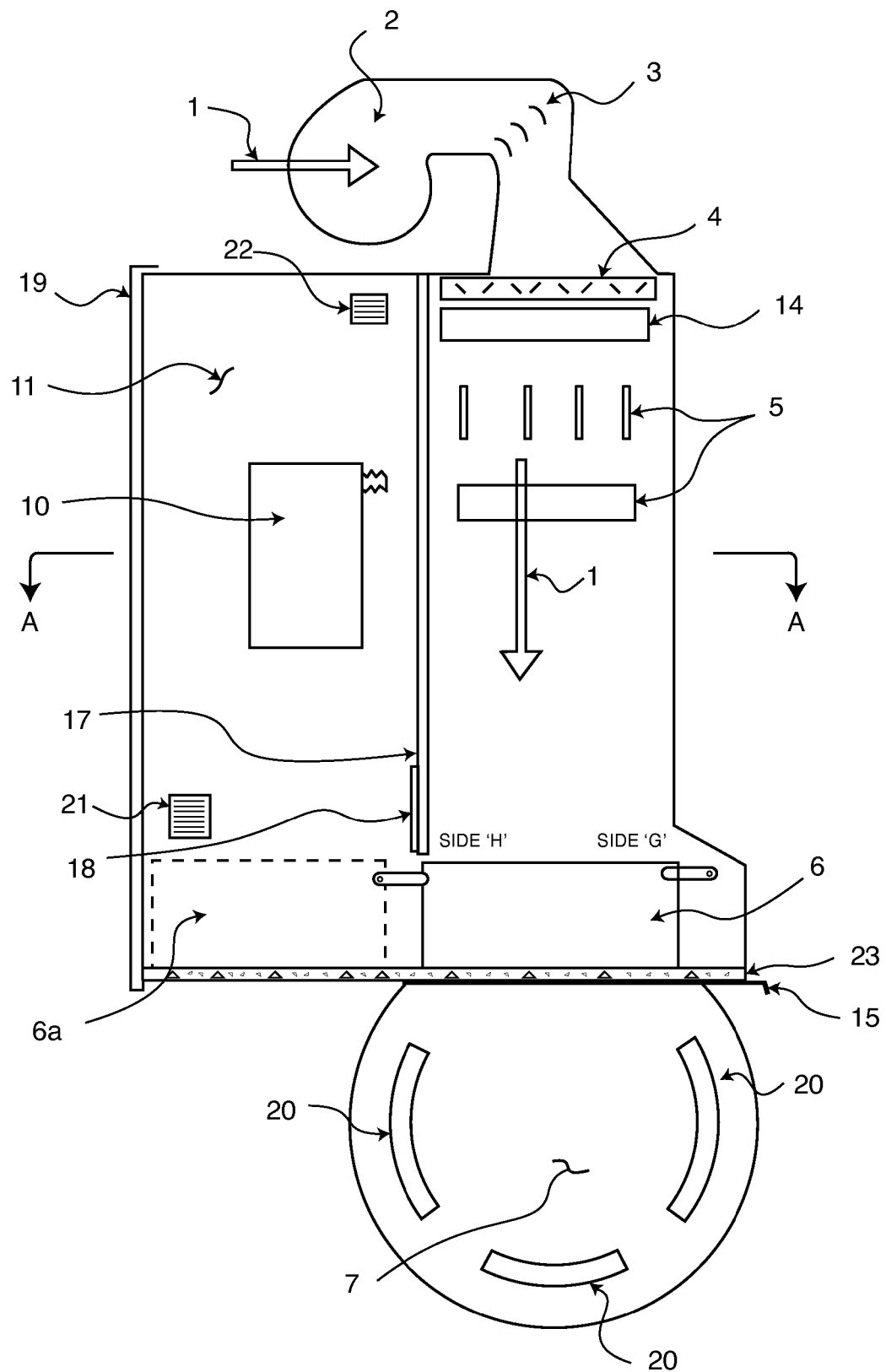
FIG. 1 a side view of the DBD cabinet containing the DBD cells, high voltage transformer, air and/or gas path into electrodes and air and/or gas into the in the DBD cabinet mixing area.
Figure 2:
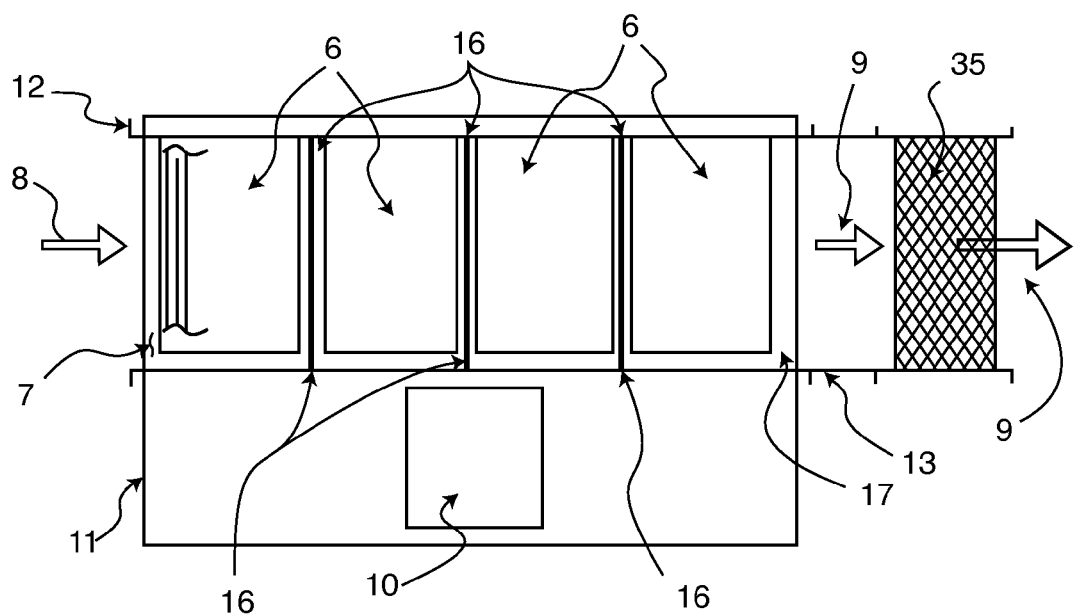
FIG. 2, section A-A of FIG. 1, showing plan view of the DBD electrode arrangement and the high voltage transformer and the air path into the apparatus that bypasses the DBD electrodes and the air path out of the mixing chamber of the apparatus.

A preferred apparatus of the invention includes a housing that forms at least one gas flow passage therethrough and at least 4 dielectric barrier discharge NTP generation cells (DBD) through which at least a portion of gas flows. The apparatus can be configured so that all of the contaminated gas to be treated flows through the four DBD assemblies, only a portion of the contaminated gas to be treated flows through the four DBD assemblies, or none of the contaminated gas to be treated flows directly through the DBD assemblies, but atmospheric air flows as the gas through the DBD assemblies and is then mixed with the contaminated gas to effect treatment of all air and/or gas. The gas passing through the DBD cells is activated so that the activated gas from the DBD cells, when mixed with gas that has not passed through the DBD, has sufficient reactive, ionized species so that it treats the gas that has not passed through the DBD. In instances where less than all of the contaminated gas to be treated flows through the DBDs, a mixing chamber is included in the apparatus to mix the gas that flows through the DBDs with the contaminated gas that does not flow through the DBD. FIGS. 1-2 show a preferred apparatus wherein all of the contaminated gas to be treated, only a portion of the contaminated gas to be treated, or atmospheric air is passed through the DBD and, if less than all gas to be treated is passed through the DBD, the gas passing through the DBD is then mixed with the contaminated gas to be treated that has not passed through the DBD to treat that gas. As specifically configured and shown in FIGS. 1-2, the apparatus passes atmospheric air and/or a portion of the air and/or gas to be treated (1), depending on the source of the air that is ducted to the top mounted fan (2) that pushes the air around the elbow vanes (3) through the adjusting damper (4) through the set of straightening vanes (5) into the DBD cells (6) and then mixes such treated atmospheric and/or process air to be treated (1) with the process air and/or gas to be treated FIG. 2 (8) which enters the mixing chamber (7) and exits the mixing section as mixed and treated air and/or gas flow (9). The optional ozone destruct catalyst (35) is incorporated at the mixing chamber outlet should the NTP field need to be energized to such an extent for the VOC and/or HVOC destruction that excessive ozone levels result at the mixing chamber outlet and such excess ozone needs to be destroyed for environmental compliance. The advantage of treating either atmospheric air or only a portion of the contaminated gas in the DBD's is that less gas flows through the DBD's and is treated directly in the DBD's meaning that the size and air flow capacity of the DBD's does not need to be as great as when all gas to be treated flows directly through the DBD's. This is the usual configuration when the contaminants are of a low concentration in a large gas flow stream, so that the system component sizing is determined by the amount and type of contaminant needing to be treated, rather than the total gas flow involved. In the case where the contaminant is more concentrated, or needing higher eV energy to oxidize and/or reduce the components of concern, or of a sufficiently low volume, then all gas can pass through the NTP field to take advantage of the higher electrical efficiency realized when all gas passes through the NTP field.

Figure 5:
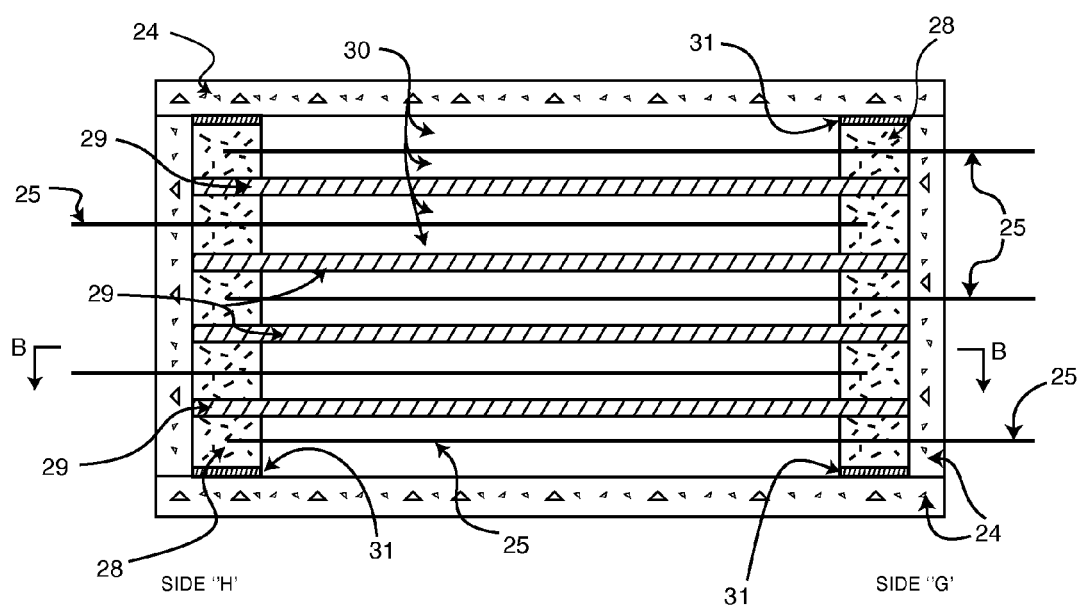
FIG. 5, a plan view of a DBD cell assembly, showing from top down how the electrodes, ceramic electrode insulators, ceramic dielectric barriers, spacing shims and electrode frame is assembled.

As shown in FIGS. 1-2, the apparatus includes a main inlet duct 7, adapted to be connected to the source of air and/or gas to be treated, such as odorous air emanating from a sewage treatment facility. The duct 7 forms a mixing chamber for mixing air and/or gas that passes through the DBD's with the gas to be treated flowing in duct 7. A totally enclosed cabinet 11 supports and completely encloses the high voltage components, such as the high voltage transformer (10) and DBD components (6) of the apparatus. Most of the low voltage electrical components and controls, including the low voltage section of the DBD power supply, and excepting for the measurement instrumentation that must be in the DBD cabinet (11) are housed in a separate standard electrical cabinet, not shown. Atmospheric air or all or a portion of the air and/or gas to be treated enters the apparatus through inlet fan (2), and flows as shown by arrow (1) in FIG. 1 through the modulating damper (4), through filter (14), is straightened by straightening vanes (5) and flows through DBD's (6) to be energized by the NTP field that the DBD's develop when electrically energized. Immediately after passing through DBD's (6), past the DBD isolation slide gates (15), the air flows into mixing chamber (7) where the air mixes with the air and/or gas that is to be treated flowing through the chamber as represented by arrow (8), FIG. 2. The air from mixing chamber (7), FIG. 1 & 2, as shown by air flow arrow (9) passes into an exhaust duct, not shown, connected to outlet end (13) of duct (7), for discharge to the atmosphere. Mixing of the gases will continue through the exhaust duct. Generally a fan will be provided in either the exhaust duct to draw the gases or in the supply inlet to push the air and/or gasses to be treated through the mixing chamber. The apparatus has its own fan (2) to ensure air flow through the DBD's as air flow through the DBD's is critical for cooling the electrodes and DBD components. The apparatus shown includes four DBD assemblies, each as shown in FIG. 5, mounted side-by-side to handle the air flow volume (1) FIGS. 1 & 2. Divider walls (16) FIG. 2, form individual inlets for the respective DBD's and with individual DBD isolation slide gates (15) FIG. 1, provides the possibility for one or more DBD to be placed out of service, directing the air flow through the other DBD's. Wall (17) has openings and slide gates (18) therethrough so that the DBD's (6) can be slid into place or removed, 6a, FIG. 1, for maintenance. The front of cover (19) FIG. 1 is removable, and interlocked to disable power, to provide access to the transformers and allow removal of the DBD's as shown in FIG. 1. DBD (6a) is a DBD (6) positioned for servicing or during removal.

The housing or cabinet (11) and cabinet door (19) and mixing chamber (7) may be made of various metals, to be compatible with the process gas, however it is normal to use 304 stainless steel or other steel type that totally encloses all components and can be securely grounded. All high voltage components are, interlocked and provided with safety grounding methods to meet applicable industrial safety codes. DBD cells (6) rest on a ceramic platform (23) so that all electrical paths from the DBD "hot" electrodes to the cabinet metal, which is at electrically ground potential, are blocked by a ceramic material of some sort.

Flow of air through inlet fan (2) and through DBD's (6) is controlled either by varying the speed of the fan and/or by the positioning of an inlet flow damper (4) FIG. 1. The air and/or gas entering through inlet fan (2) does not enter the area of the high voltage transformer (10) as this section of the housing or cabinet has a separate air supply and is cooled by a separate cooling fan (21) and vented through vent (22).

To ensure substantially equal air flow through each of the DBD's straitening vanes (5) are adjustable and provided so as to permit even adjustment of the air into the DBD's. To provide for good mixing of air exiting the DBD's with the contaminated gases to be treated, the mixing chamber (7) is round duct with internal baffles (20) to rotate the air and cause turbulence in the mixing chamber. The rotation is needed because the active species exiting the DBD's have such short half life concentrations that many of the more effective species decay to half concentration after traveling approximately 12 to 24 inches. To get maximum dispersion of the reactive species from all 4 DBD's in the configuration described herein, to the entire volume of gas in the mixing chamber it has been found best to rotate the air within the mixing chamber, as rotated by baffles (20) such that all air in the duct is rotated into position as to come into immediate and intimate contact with the air exiting each of the DBD cell assemblies. While an air rotational scheme is described here, it is possible to design another scheme to ensure laminar flow does not take place and all air within the mixing chamber and duct comes into contact quickly with the air entering from the DBD cell assemblies.

Rather than passing atmospheric air only into fan (2) and through DBD's (6), with the apparatus shown in FIGS. 1-2, it is easy to split the contaminated gas stream to be treated to direct a portion of the contaminated gas to be treated (1) to the inlet fan (2), rather than drawing in atmospheric air, or in addition to atmospheric air. Such gas to be treated is passed directly through the DBD's and is then mixed with the remainder of the gas to be treated in the mixing chamber.

Also, all contaminated gas to be treated can be directed to inlet fan (2) with the inlet (8) to duct (7) blocked. Thus, all gas to be treated is passed into inlet fan (2) and passes though the "hot" and "ground" electrodes of a DBD, so substantially all such gases are exposed directly to the NTP generated by the DBD's. Flue (7) does not act as a mixing chamber in this configuration in the same way it does in the configurations previously described. The gasses passing through the DBD's also serve the important function of cooling the electrodes of the DBD's. Thus, when the gases to be treated are passed directly through the DBD's, care must be taken to ensure that the required cooling of the components needing cooling takes place. Where the contaminated exhaust gases to be treated are hot, it may be necessary to add quench air to the air passing through the DBD assemblies so thermal damage to the DBD components is prevented.

In general, the configuration that passes all gas to be treated through the DBD's is more efficient in terms of energy required to break down the VOC compounds into harmless compounds that can be emitted into the environment, as the electron activity in the NTP field assists in breaking the molecular bonds of the compounds of concern by direct electron collision and ionization and the extremely short lived, higher energy radicals and atomic species, those with half lives of 200 nano seconds or less such as oxygen singlet, are available to effect the oxidation and reduction of the VOC compounds and molecules. In the bypass or partial bypass modes, the direct ionization of the gas to be treated does not occur and the shortest lived radicals which are the most chemically active have decayed significantly and are not assisting with the oxidation and reduction of the VOC compounds in the mixing chamber, though there still is a significant population of the longer lived radicals and active species. In cases where the gas to be treated needs unusually high energy to be oxidized and/or reduced, such as in exhaust gases that would otherwise have to be incinerated to treat the gas, all of such gas must pass directly through the NTP, as it is only within the NTP where the direct ionization occurs and the reactive species with the highest ionization energy levels are developed and can oxidize and reduce those compounds that need these conditions to disrupt the bonds that need a higher energy level to oxidize and/or reduce them. In some cases, there are compounds that need even higher energy applied to the gasses to achieve the destruction removal levels required and in that case the gas can be routed through multiple NTP fields in series to effect treatment.

While the actual treatment of the gas to be treated may be more efficient in terms of energy required to neutralize the VOC compounds in the gas when all gas is passed through the DBD's, large volumes of gas would require large numbers of DBD's to provide the capacity necessary to pass all gas to be treated through the DBD's. Thus, in such instances, and where all the gas to be treated does not necessarily need to pass through the NTP field to be effectively treated, a smaller amount of atmospheric air, or a smaller portion of gas to be treated, can be passed through a fewer number of DBD's and such gas then used to treat the remaining gas by the mixing described.

Figure 6:
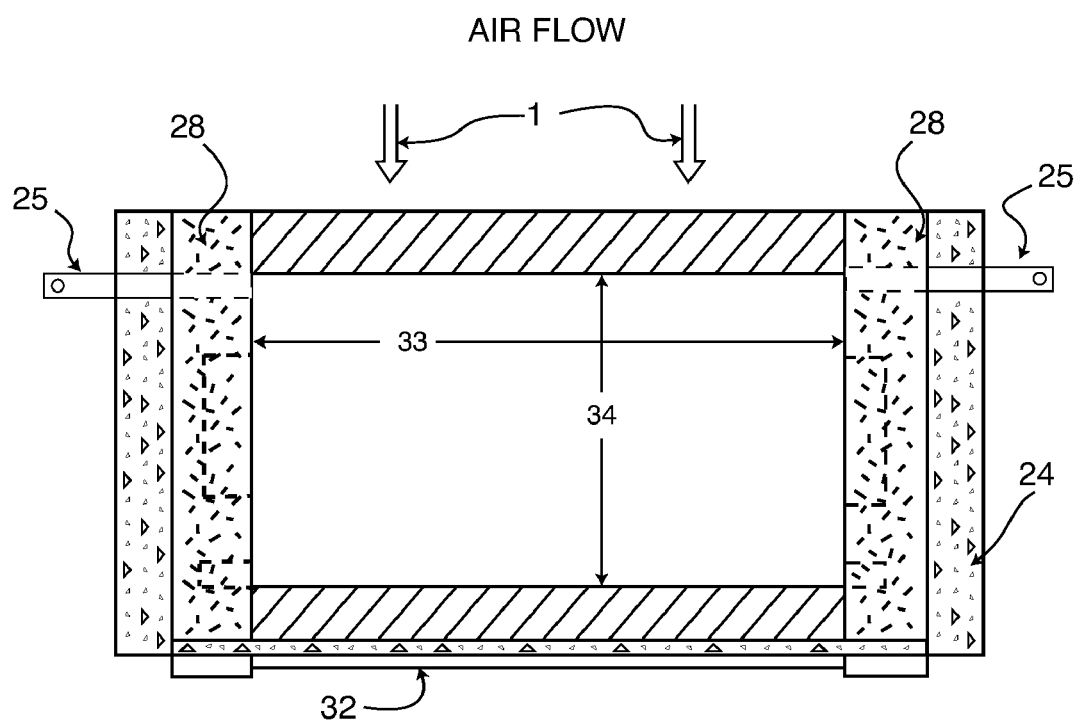
FIG. 6, section B-B of FIG. 5 is a side elevation of two electrodes showing the shape of the electrode and the ceramic end insulators and how they overlap when in the "hot" position and when in the "ground" position so that non thermal plasma does not form near or inside the electrode end insulators or the electrode support frame.

Each of the DBD's (6) includes a rectangular frame (24) FIG. 5, made from a non combustible or ceramic material such as polymer concrete, enclosing and supporting a plurality of electrodes (25, 26) FIG. 3 & FIG. 5, positioned in alternating "hot" and "ground" arrangement so the electrodes with the conducting tab (26) placed on one side will function as a "hot" electrode and if the same electrode is placed with its conducting tab on the other side it will function as a "ground" electrode FIG. 5-6. Generally the "hot" electrodes will be at either a positive or a negative voltage with respect to the "ground" electrodes when energized, however, the "ground" electrodes always are connected to electrical ground. The electrodes (25, 26) have end plate ceramic insulators, one type for the end that has the connection tab (27) and another type for the end of the electrode that does not have the connection tab (28) and these insulators are sealed on the electrode using a silicone or similar type of electrical insulation sealant. The electrodes have a unique shape on the edges that are embedded in the end insulators, so that when the electrodes are in the alternate placement of "hot" side and "ground" side, the conducting portion of the electrodes within the insulator is not in proximity to the nearest electrode and in this way the formation of a partial NTP field at the electrode end area is prevented. The goal is to have the NTP field form only where there is air and/or gas passage throught the DBD and in this way keep all NTP forming components air cooled. The electrode itself is made of a catalytically active material, ASTM grade 1 or 2 Titanium, typically 16 gage in thickness so it retains its flat shape in this case, or it could be another catalytically active material such as palladium or cadmium or it could be a stainless steel with a catalytically active coating, with the material selection dependent on the VOC that it is designed to treat. The dielectric barrier plate (29) is also a ceramic, either borosilicate glass or a high purity alumina dielectric and is positioned on both sides of the electrode with an air gap (30) FIG. 5, surrounding all exposed parts of the electrodes. The DBD barrier (29) FIG. 3-5, is sized length and height wise as to give a sufficient electrical air arc distance between the "hot" and "ground" electrodes so as to exceed the DBD voltage that the electrodes operate at by a factor of 2 in high humidity air. The DBD barrier (29) may be coated with a catalytically active coating, such as Titanium Dioxide, to assist in the oxidation of the VOC's. A Teflon spacer (31) FIG. 5 is used to permit frame adjustment, permit thermal expansion and compensate for minor tolerance changes in the ceramic components.

An electrical connection tab (26) extends from the electrodes through the DBD support frame so that all electrical connections are made outside the area where the air and/or gas pass through the DBD barrier. The electrodes that extend nearest the frame outside edge Side "G" FIGS. 1 and 5 are the "ground" electrodes and those that are positioned at Side "H" the "hot" electrodes.

It has been found that exposing catalytically active material in the NTP field significantly enhances the VOC destruction abilities of the NTP field. Also, cooling of both electrodes and the dielectric is important in long term operation, so all sides of the dielectric barrier and the electrodes are exposed to the air and/or gas flow through the DBD barrier assembly. To gain maximum benefit from the NTP and possible catalysts, catalytically active materials are involved in the electrodes themselves, can be coated on the dielectric barrier and in addition it has been found that a screen on the DBD outlet made of a catalytically active material such as ASTM grade 1 or 2 Titanium wire mesh (32) FIG. 6, also enhances the VOC destruction properties of the DBD assembly.

The ceramic insulators on the ends of the electrodes is sealed on the metal part of the electrodes by a sealant such as silicone to eliminate a water passage from forming as a result of any condensation or moisture in the and/or gas passing through the DBD cells.

The geometry of the electrodes when placed in either the "hot" position and "ground" position is such that the NTP field formed between electrodes is confined to the area where the electrodes directly oppose each other through the dielectric medium and as such, this geometry serves to control the NTP and keep it away from the support frame so the frame does not suffer damage from the NTP field. The area of NTP generation is only the area enclosed by lines (33) & (34) in FIG. 6, i.e., the area inside the perimeter of the electrodes.

The excitation of the electrodes that causes the NTP field to form in the DBD assembly will vary according to the application. The "hot" electrodes and "ground" electrodes will have opposing polarity so that a NTP forms in the directly opposing areas between the electrodes. The electrodes can be excited by alternating current of either sine wave, square wave, or other wave shape as deemed effective, with the "hot" electrode being either positive or negative with respect to the "ground" electrode at any given instant of the alternating current cycle even though the ground electrode is always connected to electrical "earth" ground. The peak voltage between electrodes should be at least about 2,000 volts and usually will be in the range of between about 2,000 volts and about 150,000 volts, which is determined by the actual cell geometry required for a given application. The frequency should be between about 30 Hz up to about 50 MHz, and in some cases, higher. Where radio frequencies are used, for example in the MHz range, or where fast rise time pulses, of nano second rise time, and short duration pulses, alternating in polarity are applied then it is possible to remove the dielectric barrier and achieve a NTP field without the barrier.

It has been found useful to group the DBD's in groups of four so that the DBD assemblies are easily handled and where all DBD's are powered by the same power supply each DBD assembly is monitored for current flow in the ground electrode circuit as a change in current flow of any DBD assembly can be used to indicate a DBD fault. For the embodiment shown, FIGS. 5 and 6, there are two "hot" electrodes, with three "ground"electrodes for each of the four DBD's, all DBD's powered by a single transformer but fed through a separate disconnect means, that could be powered by an invertor that could be fed from three phase power. When energized, these electrodes form the NTP field in the directly opposed areas between the electrodes, i.e., the area enclosed by lines (33) and (34) in FIG. 6. An NTP field will develop under many possible voltages and frequencies with the higher frequencies needing less voltage to create an NTP field. For example, a 5 kHz sine wave, with a root mean square voltage of 6 kV will produce an NTP field, as will a 60 Hz sine wave with 14 kV in the same DBD assembly. The density of the NTP field is an important issue for VOC destruction efficiency, with general literature describing two main types, filamentary that results in a sparse NTP field and an atmospheric glow discharge in which the NTP is denser. The best VOC destruction efficiency is realized when the NTP field is an atmospheric glow discharge and this condition is achieved by a number of means which include increased electrical power density in the DBD electrode area, electrical impedance matching of the DBD capacitance and power supply and frequency, voltage and wave shape with the higher frequencies that are typically greater than 10 kHz being better than the lower frequencies, those below 10 kHz. Pulse power is another way to operate the DBD as it has the effect of increasing the population of the various reactive species over that produced with simple sine wave power without the need for a dielectric barrier. In general, a fast voltage rise time is desired to create an "avalanche" of electron movement across the air space in the DBD to maximize the creation of reactive species desired from the NTP field. Sine wave power of less than (approximately) 10 kHz has a relatively slow rise time. The slower rise time results in charge "leakage" across the DBD barrier and does not contribute to the formation of the reactive species. In frequencies below 10 kHz the losses become very significant in that only a fraction of the power delivered by the invertor to the high voltage transformer and DBD combination actually creates the reactive species required. While on lower powered systems that range up to 5 kW even 50% loss of power that is consumed as to what actually creates the reactive species is not too significant in terms of excess heat, efficiency loss and component cost, and as this design includes those apparatus designs in the 5 kW range up to 100 kW range and more per system, with the possibility of multiple 100 kW systems used on a give large scale application. At 50 kW to 100 kW and more, some of the component cost for power supply, transformers and support systems of power delivery and component cooling, as well as the waste heat loss in the DBD barrier itself mandates the system be designed at a more efficient operating point where higher frequency operation in combination with correct impendence matching and low loss dielectrics be utilized. When attention is paid to such details, the combined losses can be reduced enough so that capital and operation costs are significantly lower than when these details are ignored.

A satisfactory power supply includes a single transformer (10) FIG. 1 for all DBD's, powered by a frequency invertor, located in the control cabinet, not shown, that is capable of driving a transformer with a capacitive load. An impedance matching network that may or may not contain additional inductive and/or capacitance in either the transformer primary or secondary circuit is necessary so that the combined inductive reactance of the transformer and extra inductor nearly matches the "live" capacitance of the DBD's, thus the system runs at "near" electrical resonance to get maximum power into the NTP. The term "live" capacitance is needed, as the capacitance of the "hot" and "ground"electrodes, when assembled in their frame and measured when the system is not powered, differs from that measured when the system is in operation. This is because the NTP changes the capacitance of the DBD when in operation so that must be matched by the inductance and frequency when in operation to achieve the desired NTP level.

The invertor that powers the transformer is typically controlled through a programmable logic controller (PLC) system that monitors all currents in the DBD ground leads, selects the maximum current and modulates the signal to the invertor so that the power delivered by the invertor remains at the setpoint entered. Changes in the gas being treated, such as temperature, humidity, plus the effects of component heating (transformers & inductors) can cause variations in the NTP developed and the power consumed, and this is held steady by the PID control algorithm calculated by the PLC. In addition for steady plasma control, the current monitoring in each of the DBD assembly ground currents servers to indicate if a fault has developed in any of the DBD's. All should operate with similar power, with a difference of only a few percent. Should any DBD suddenly differ in power, either more or less, is an indication of a DBD fault and the system can shut down to avoid excessive damage to the DBD components and alert maintenance personnel.

The power delivered by the invertor to the primary of the transformer is varied by either changing the operating frequency of the invertor to tune or detune the resonant circuit or change the width of the pulses delivered to the transformer from the invertor, through the PLC controller (PID) algorithm that controls the power output of the invertor and this in turn adjusts the power output of the transformer, hence to the "hot" and "ground" electrodes, which adjusts the level of the NTP produced. Such control typically is very non-linear as the system runs normally in resonant mode, where the power resonating in the DBD capacitance and the inductance of the system has a higher current flow than that of the invertor delivering power to the system. Typically, a closed PID control loop that monitors the actual power output of the invertor is measured and controlled to a power level setpoint that can be cascaded from another control loop from an ozone sensor, or the setpoint can be manually entered. Other system states, such as contactor status, for incoming power to the invertor, and individual DBD ground currents, air flow through the DBD cells and various temperatures is also monitored and displayed by the PLC system. An important interlock monitored by the PLC is the DBD differential pressure, which represents the air and/or gas flow through the DBD's. Normally, two hot electrodes with three ground electrodes in each of the four DBD assemblies needs a minimum of 1000 ACFM of gas for each DBD assembly for a total of 4,000 ACFM at 70 degrees F. for this particular embodiment. In this embodiment, this results in a differential pressure of 0.8 inches of water column at 4000 ACFM. The gas must be filtered to the extent of removing coarse particles and debris that might not pass between the gas flow space separating the "hot" and "ground" electrodes. Should the filter clog or the system fan fail or any other reason cause insufficient air and/or gas to pass through the DBD's, as indicated by a drop in differential pressure, the PLC will sense this and disable the power to the unit and present and alarm indication. This is needed, otherwise the DBD's will overheat and the dielectric separating the electrodes might break, destroying the dielectric integrity resulting in malfunction.

This embodiment as described will be rated for 10 kilowatts as, measured as the power input to the invertor which is not necessarily what is being dissipated at the DBD as it normally operates in resonant mode and the q factor of the components could have a higher reactive power flowing in the DBD. Such system has been successfully used to treat the VOC's that are odorous from a pet food production facility, treating 20,000 ACFM of air that was used to dry and cool the feed.

Other embodiments are possible, with different DBD dimensions different DBD electrode count in each respective DBD assembly, different airflows, different power densities and different power ratings. Single-phase units, for small airflows, are possible, typically using power from 25 watts up to approximately 3000 watts. Systems needing more power are typically powered with three-phase power, though some power supplies, accepting three phase in and single phase out, with different power electronics, such as nanosecond pulsed power, SCR control and different IGBT arrangements and much higher frequencies, are possible.

In choosing a power and gas flow design to implement in a given application that needs VOC abatement that may or may not have an odorous component, the following considerations are important:

Due to the wide ranging nature of differing VOC's, their odorous intensity, the character of the perceived odor and the inexact science of determining the specific composition, potency, and the energy needed to oxidize and/or reduce a given mix of VOC compounds and/or HVOCs, the systems are sized for unknown VOC applications by operating a pilot sized system at the odor site.

The pilot sized system has all the same flow paths as the full-scale system and is operated with a scaled down, known VOC laden airflow that may or may not be odorous from the process to be treated in concert with adjustable power and frequency levels with various air flow configurations to determine the optimum operation configuration, residence time and joules per liter density required to treat the gas.

The determination of the appropriate mix and flow of VOC laden and/or non-VOC contaminated air to the pilot inputs depends on the nature of the VOC's and possibly the odorous potency and characteristics. In cases where the VOC is highly concentrated and cannot be treated by any other means, except, possibly incineration, or if the VOC contaminated air flow can all pass through the DBD cells, then it is best to configure all odorous air to pass through the DBD assembly as that has the best energy and efficiency effect.

In applications where the VOC is diluted and of a potency that does not need to be passed directly through the DBD to be neutralized and/or the air stream is large, then the system may best pass a part of the contaminated air stream an/or atmospheric air in any desired mix ratio through the DBD and inject the activated species formed by the DBD assemblies from this air into the odorous air stream to provide the treatment.

In applications where some extremely high concentration or difficult to oxidize and/or reduce VOCs need to be treated, then such must pass entirely through the DBD assemblies and be treated directly by the NTP fields, as only the most active species that operate entirely within the NTP field will neutralize such difficult VOCs. In such applications, the lesser reactive species may still exist in the air exiting the DBD, so it is useful to process some less concentrated VOC's from other air streams, such as ambient factory air and they are admitted to the pilot apparatus through the DBD bypass input. In this configuration the DBD of the pilot system and the mixing chamber of the pilot system will treat both odor sources at the same time.

It is also possible that multiple DBD assemblies be configured to operate in series, that is an air stream be arranged so it passes into one DBD assembly and through an NTP field, then pass over the catalytic mesh underneath the first DBD assembly, then pass through another DBD assembly and through a second NTP field through that second catalytic mesh, and so on for multiple NTP catalytic treatment of a given air stream. Once an energy level has been established for given air flow rates to each system input for a given odor source or combination of sources, the full scale system can then be sized.

The system illustrated in FIGS. 1-2 is in a bypass system configuration, using a total of 4000 actual cubic feet of either atmospheric or contaminated air per minute (ACFM) through the DBD's, to be activated by the NTP to create the reactive species that are mixed with the gas to be treated. The treated gas volume can be from 1000 ACFM up to 50,000 ACFM, depending on the concentration of the VOC needing treatment. This same configuration could also pass gas in a mix, in that some of the gas to be treated flows through the NTP field. In this configuration, the gas passing through the NTP field is not only treated to remove the pollutant of concern, but also is activated so that it can treat other air.

A further feature of the invention is that the efficiency of the VOC destruction removal can, with some VOCs, be directly monitored and automatically controlled using an ozone monitor. Ozone is one of the longest-lived reactive oxygen species that are formed to treat the odorous gas and there is usually a small amount of residual ozone in the treated gas stream when enough species has been created to neutralize the VOC levels in the case of VOCs that may or may not be odorous and are treatable with the longer lived species. As the power applied to the DBD's controls the amount of active species produced (within the limits of the DBD's power handling rating), the power can be modulated automatically to maintain a small residual ozone level, to match EPA or local authority guidelines. Since adjusting the power to the DBD's controls the NTP level, hence the amount of active species created, then the level of active species required to treat any combination of gas flow and contaminant level is modulated so enough active species is produced to fully oxidize and/or reduce the VOCs contained in the gas stream and leave a small residual ozone in the discharge. In the case where the small residual ozone drops, it means that there is an increase in the VOCs to be treated so the automatic control loop can increase power to the DBD's to increase the NTP field which in turn generates more active species to meet the treatment demand. In the case where the residual ozone increases, then the VOC load has decreased so the automatic control can reduce the power to maintain the small residual ozone setpoint to stay within authority limits for ozone emissions. In cases where the gas to be treated must all pass through the NTP field for effective treatment, due to the high energy requirement of the VOCs needing treatment, then it might not be possible to close the control loop using ozone as the process variable, as the gas being treated would not consume the lower energy ROS species of which ozone is a member. In such cases a manual operation level might have to be set.

The aforementioned Programmable Logic Controller (PLC) that interlocks all safety devices and controls the on/off and modulating functions of the apparatus also incorporates interlocks of the system according to factory needs. In other words, it will automatically shut down when the factory halts production and/or isolate a fault and give an alarm message if such occurs in the apparatus.

The system of the invention can be added on to existing factories or integrated as part of a new plant design. The changes in equipment are minimal to integrate this technology into a factory and the only operating consumable commodity is electricity and the occasional filter replacement. The catalytic components used in VOC destruction are not consumed in this system. Further, the technology is scalable to any size from small domestic sized units for point source odors of a few hundred ACFM, all the way to the largest factories that release tens of thousands of ACFM and more VOC pollutant laden air that may or may not be odorous, into the environment. When large volumes of air, and/or extremely high VOC load in combination with large air volumes must be treated, multiple units can be combined in parallel and/or series parallel to treat the air.

While the invention has been described as apparatus for treatment of volatile organic compound contaminants in gas emissions, the invention can be used in a variety of other applications to oxidize and/or reduce a compound or compounds of concern to a desired form. One such application would be to reduce the hydrocarbon content in air emission applications to an acceptable level prior to release into the atmosphere. Gas fumes such as combustibles, fine particulate emissions, such as smoke and even $H_2S$ from oil wells or other processes can be oxidized and reduced using this technology that otherwise would require burning or flaring to prior to being discharged into the atmosphere. In many cases, additional fuel, such as propane, is needed to keep a flare in combustion when the concentration of combustibles in the gas to be emitted falls below the ignition point. With this technology, an ignition concentration is not required to fully oxidize and reduce the gas, the NTP is able to fully oxidize and reduce the gas to be treated regardless of the hydrocarbon level. Other hydrocarbon compounds, such as those containing chlorine and fluorine are also treatable by this invention.

Whereas the invention is here illustrated and described with reference to embodiments thereof presently contemplated as the best mode of carrying out the invention in actual practice, it is to be understood that various changes may be made in adapting the invention to different embodiments and to the availability of improved materials (power supplies or ceramics for example) without departing from the broader inventive concepts disclosed herein and comprehended by the claims that follow.

What is claimed is:

1. Apparatus for treatment of airborne pollutants comprising:
    a planar dielectric barrier discharge (DBD) type non-thermal plasma (NTP) generation cell assembly including at least one electrically hot electrode and at least two electrically ground electrodes provided in an alternating arrangement and mounted side-by-side in a frame, each of said at least one electrically hot electrode and said at least two electrically ground electrodes is an electrically conductive plate of having a pair of opposed major faces, and at least one electrically hot electrode or said at least two electrically ground electrodes is made from a catalytically active material;
    dielectric barriers which are plates having a pair of opposed major faces and mounted in said frame between said at least one electrically hot electrode and said at least two electrically ground electrodes with the major faces of the dielectric barriers are in planar arrangement with the major faces of said at least one electrically hot and said at least two electrically ground electrodes;
    air gaps provided on either side of said dielectric barriers;
    a gas inlet for directing gas into said cell assembly;
    a gas outlet for discharging gas from said cell assembly;
    a gas flow path provided between said gas inlet and said gas outlet, said gas flow path extending through said air gaps;
    insulators provided on side edges of each of said at least one electrically hot electrode and said at least two electrically ground electrodes to electrically isolate said at least one electrically hot electrode and said at least two electrically ground electrodes from said frame and couple each of said at least one electrically hot electrode and said at least two electrically ground electrodes to said frame, said side edges being provided with an offset shape so that formation of an NTP field near said frame between opposing conductive parts of said at least one electrically hot electrode and said at least two electrically ground electrodes is avoided, said at least one electrically hot electrode and said at least two electrically ground electrodes positioned in said gas flow path exposed to said gas for contacting said gas by said catalytically active material from which the at least one of the electrically hot or the electrically ground electrodes is made;

wherein said at least one electrically hot electrode and said at least two electrically ground electrodes generate NTP fields in the air gaps and on the surface of the separating dielectric barrier between opposing surfaces of electrically hot electrodes and electrically ground electrodes when power is applied to said cell assembly, said NTP fields being located in said gas flow path and which produce chemically active species, electrical bombardment and electron/molecular collision for the ionization, decomposition, oxidation and reduction to transform said airborne pollutants to harmless oxidized and reduced forms prior to environmental release.

2. Apparatus for treating airborne pollutants according to claim 1, wherein each of said at least one electrically hot electrode and said at least two electrically ground electrodes are made of the catalytically active material.

3. Apparatus for treating airborne pollutants according to claim 1, wherein said dielectric barriers are one of:
coated with a catalytically active material and comprised of a catalytically active material.

4. Apparatus for treating airborne pollutants according to claim 1, further comprising a catalytically active material provided at said gas outlet.

5. Apparatus for treatment airborne pollutants according to claim 1, wherein said gas outlet expels treated gas and said gas inlet receives one of:
air and gas including pollutants.

6. Apparatus for treatment of airborne pollutants according to claim 5, further comprising a gas mixing chamber to receive treated gas and gas including pollutants, said treated gas including extra chemically active species from said NTP fields to treat said gas including pollutants, said mixing chamber including an outlet for discharging treated gas.

7. Apparatus for treatment of airborne pollutants according to claim 1, wherein said frame is non-conductive.

8. Apparatus for treatment of airborne pollutants according to claim 1, wherein multiple cell assemblies are arranged in parallel to treat large volumes of gas.

9. Apparatus for treatment of airborne pollutants according to claim 1, wherein multiple cell assemblies are arranged in series.

10. Apparatus for treatment of airborne pollutants according to claim 1, wherein multiple cell assemblies are arranged in series parallel to treat large volumes of gas.

11. Apparatus for treatment of airborne pollutants according to claim 3, wherein said dielectric material is a non-conductive material selected from the group consisting of: alumina and borosilicate glass.

12. Apparatus for treatment of airborne pollutants according to claim 7, wherein said frame is made of a material selected from the group consisting of: ceramic materials, polymer concrete, Teflon and non-metallic insulator materials.

13. Apparatus for treatment of airborne pollutants according to claim 1, wherein said dielectric barriers are spaced equally between said at least one electrically hot electrode and said at least two electrically ground electrodes, a width of said air gaps being between 0.1 mm and 25.0 mm.

14. Apparatus for treatment of airborne pollutants according to claim 1, wherein said dielectric barriers are between 0.5 mm and 10.0 mm thick.

15. Apparatus for treatment of airborne pollutants according to claim 1, wherein said insulators electrically isolate each of said at least one electrically hot electrode and said at least two electrically ground electrodes from said frame.

16. Apparatus for treatment of airborne pollutants according to claim 2, wherein said insulators are made of a ceramic material.

17. Apparatus for treatment of airborne pollutants according to claim 2, wherein said dielectric barriers are sized to extend beyond each of said at least one electrically hot electrode and said at least two electrically ground electrodes on all sides, said dielectric barriers being sized to maximize an electric arc travel distance between said at least one electrically hot electrode and said at least two electrically ground electrodes to minimize short circuiting of said cell assembly.

18. Apparatus for treatment of airborne pollutants according to claim 1, wherein a perimeter of said at least one electrically hot electrode defines a perimeter of an NTP field, said NTP field being spaced from said frame and said insulators.

19. Apparatus for treatment of airborne pollutants according to claim 18, wherein said NTP field is a "glow discharge" type NTP field and said power applied is an AC voltage between 1000 volts and 150,000 volts having a frequency of between 30 Hz and 50 MHz.

20. Apparatus for treatment of airborne pollutants according to claim 18, wherein said NTP field is a "glow discharge" type NTP field and said power applied is a bi-polar pulse.

21. Apparatus for treatment of airborne pollutants according to claim 20, wherein said bi-polar pulse includes a pulse rise time of between 10 nano seconds and 500 micro seconds, a pulse duration of between a value equal to said pulse rise time and 500 micro seconds and a pulse fall time that is equivalent to said pulse rise time followed by a pulse rise time equivalent to said pulse rise time in an opposite polarity pulse, said bi-polar pulse having an off period so that a repetition rate results in a power density of between 0.01 to 1000 joules per second per square centimeter of hot electrode surface.

22. Apparatus for treatment of airborne pollutants according to claim 18, wherein said NTP field is a "glow discharge" type NTP field generated by a combination of positive and negative pulses with a DC bias.

23. Apparatus for treatment of airborne pollutants according to claim 17, further comprising a NTP generation cell power control system to control said power applied to said cell assembly, said NTP generation cell power control system having a proportional integral and derivative (PID) type controller, said NTP generation cell power control system for controlling NTP field power.

24. Apparatus for treatment of airborne pollutants according to claim 23, further comprising an ozone sensor that provides an indication of an ozone content of said treated gas to said NTP generation cell power control system to adjust power applied to said cell assembly in order to produce at least the required amount of said chemically active species for destroying said airborne pollutants.

25. Apparatus for treatment of airborne pollutants according to claim 6, wherein said gas mixing chamber includes a first gas inlet and a second gas inlet, said first gas inlet being coupled to an outlet of said cell assembly to receive said treated gas, said second gas inlet selectively coupled to a source of said gas including pollutants.

26. Apparatus for treatment of airborne pollutants according to claim 25, further comprising an ozone destruct catalyst provided at said outlet of said mixing chamber.

27. Apparatus for treatment of airborne pollutants according to claim 25, further comprising a catalytically active material provided at said gas outlet of said cell assembly and an ozone destruct catalyst provided at said outlet of said mixing chamber.

28. Apparatus for treatment of airborne pollutants according to claim 1, said airborne pollutants being selected from the group consisting of:

Volatile Organic Compounds (VOCs), Halogenic Volatile Organic Compounds (HVOCs), Hydrocarbon compounds (HCs), and fine suspended organic particulate matter.

29. Apparatus for treatment of airborne pollutants as claimed in claim 2, wherein said catalytically active material comprises at least one of Titanium, Palladium, Cadmium or other known catalysts.

30. Apparatus for treatment of airborne pollutants as claimed in claim 1, wherein said at least one electrically hot electrode and said at least two electrically ground electrodes are identical in size and shape.

* * * * *